United States Patent [19]

Pavlin

[11] Patent Number: 5,026,754
[45] Date of Patent: Jun. 25, 1991

[54] RESINOUS BINDERS COMPRISING A METAL ROSIN RESINATE AND A PENDANT TERTIARY AMINE POLYMER

[75] Inventor: Mark S. Pavlin, Lawrenceville, N.J.

[73] Assignee: Union Camp Corporation, Wayne, N.J.

[21] Appl. No.: 340,108

[22] Filed: Apr. 18, 1989

[51] Int. Cl.$^5$ ............................................. C08L 93/04
[52] U.S. Cl. .................................. 534/272; 524/270; 524/274
[58] Field of Search ........................ 524/270, 274, 272

[56] References Cited

U.S. PATENT DOCUMENTS

| | | | |
|---|---|---|---|
| 3,681,268 | 8/1972 | Bunk et al. | 524/274 |
| 3,929,703 | 12/1975 | Weymann et al. | 524/274 |
| 3,932,329 | 1/1976 | Lakshmanan | 524/274 |
| 4,067,938 | 1/1978 | Jack | 524/274 |
| 4,116,910 | 9/1978 | Rudolphy | 524/270 |
| 4,525,216 | 6/1985 | Nakanishi | 524/270 |
| 4,654,082 | 3/1987 | Frilette | 524/270 |

Primary Examiner—John Kight, III
Assistant Examiner—Dennis R. Daley
Attorney, Agent, or Firm—Edward J. Sites

[57] ABSTRACT

A resinous binder is disclosed which is composed of a metal rosin resinate and a dilution increasing effective amount of a pendant tertiary amine polymer type resin having greater than 50,000 weight average molecular weight.

Also disclosed is a gravure printing ink which comprises a solvent, a colorant and a binder wherein all or a portion of the binder consists of the resinous binder of this invention. The use of the resinous binder of this invention in ink compositions results in significant dilution improvement without adversely affecting other desirable properties.

16 Claims, No Drawings

RESINOUS BINDERS COMPRISING A METAL ROSIN RESINATE AND A PENDANT TERTIARY AMINE POLYMER

This invention relates to novel resinous binders and their use in gravure ink compositions and, more particularly, is concerned with resinous binders having a high "dilution," comprised of a metal rosin resinate and a high molecular weight, pendant tertiary amine type polymer.

BACKGROUND OF THE INVENTION

Inks used for gravure printing are comprised of a colorant, a binder and a solvent. It is crucial to the performance of gravure inks that they have the correct flow characteristics, in particular the correct viscosity. This is important in the inking of the recessed cells of the etched or engraved printing cylinder and the delivery of the ink from the cells of the plate to the substrate. The viscosity of the ink is also important in order to achieve an acceptable degree of holdout (resistance to penetration) of the ink when printed on paper, especially uncoated paper stock having high porosity. The lower the ink viscosity the more severe is the problem of lack of holdout.

The proper ink viscosity can be easily achieved by the use of greater amounts of binder and lesser amounts of solvent, but this increases the overall cost of the final ink. Also, use of large amounts of binder to obtain the desired viscosity means that in the final thinning of the ink by the printer less solvent can be employed, giving the printer less latitude in his formulations. The inks which cannot readily be diluted are also perceived by printers to have "low mileage," that is, less paper coverage per gallon. Printers prefer inks that can be diluted with greater amounts of solvent because of the benefits of economy of the final ink formulation and convenience in the formulation process.

The term "dilution" is a term of art used by ink formulators to describe the amount of solvent required to thin a given ink composition to a desired viscosity. The term may also be used for unpigmented resin solutions generally referred to as varnishes. In this context, the dilution of a resin or varnish is related to the property of "intrinsic viscosity" as used in the polymer art, that is, the higher the resin molecular weight, the higher the viscosity of a solution of the resin at a given concentration and, therefore, the higher its possible dilution.

Metal rosin resinates have commonly been employed as ink binders in the formulation of gravure inks. The resinate serves to provide the ink with the necessary viscosity and dilution, transfer, printed gloss and rub resistance. However, achieving the desired high dilution with a metal rosin resinate alone has been difficult if not impossible to achieve because of the generally very low molecular weights typical of this class of resins.

In particular, desirable high dilution values in the range of 90–110 mls (solvent needed to reach print viscosity of about 7.5 cps as measured from a resinate solids concentration of 50%) can be achieved only by neutralizing the resinate system to nearly 100% of theoretical with calcium hydroxide and, optionally, zinc oxide and magnesium oxide. This, however, results in unacceptably high resinate viscosity and severe viscosity instability. In other words, the desired high dilution resinates can be made using conventional resinate formulations but they are too viscous to use conveniently, are difficult to manufacture, and are prone to increase further in viscosity during storage. Furthermore, higher dilution values of over 110 mls cannot be achieved using the above-described conventional approaches.

Various additional resins have been combined with the metal rosin resinates or added to the ink as dilution builders and also as binders in their own right. Highly phenol-modified rosins can be used in place of conventional rosins to achieve high dilution. However, these rosins are expensive and the resulting phenol-contaminated manufacturing waste must be treated or disposed as hazardous waste to avoid damage to the environment, which further increases the resinate cost. Cellulose derivatives are widely used in the industry to build ink dilution. These derivatives, especially ethyl cellulose and ethyl hydroxyethylcellulose (EHEC), have very high molecular weights. However, they are very expensive and have poor compatibility with resinates.

It has recently been taught by Janusz, U.S. Pat. No. 4,690,712 (1987), that reaction products of a metal rosin resinate and an amino-polyamide are useful as vehicles for publication gravure printing inks. Dilution improvements are reported. These amine groups are secondary amines incorporated in the polymer backbone by condensing diacids and linear poly(ethyleneamine) type diamines. The polymer also possesses primary amine groups as chain termini. In making such reaction products, the polyamide must have sufficient primary and secondary amino groups so as to be soluble in toluene and also to be able to react in the ratio of 1–5 equivalents of the amino-polyamide to 1–5 equivalents of the carboxyl groups of the metal resinate. This need for balancing the stoichiometry of amino and carboxyl groups poses reproducibility and even gelation problems, as well as requiring more of the relatively costly polyamide to be used relative to the less costly resinate acid. The solubility requirement severely limits the softening point and molecular weight of the amino-polyamide. Typical weight-average molecular weight values for "curing agent" type polyamides are only 2,000–5,000. Additionally, inks prepared with these polyamides are excessively thixotropic, which is undesirable for a fluid gravure ink.

The prior art also describes the use of high acid number, low molecular weight polycarboxylic polymers to improve resinate properties. For example, Schefbauer, in U.S. Pat. No. 4,244,866 (1981), teaches the use of alpha-olefin/maleic anhydride copolymers and partial esters thereof with limed rosin to prepare novel resinates. Schefbauer nowhere discloses achieving particularly high dilution. The polymers disclosed by Schefbauer are claimed to allow the preparation of resinates with very high lime levels. To achieve this end, the polymers must have low molecular weights and high acid numbers, typically over 130, and are used in relatively large amounts, typically 10 weight percent on a total solids basis. These polymers have poor toluene tolerance and, in fact, are used as solutions in 60/40 toluene/methyl ethyl ketone. This approach necessarily introduces an undesired solvent, a ketone, into the gravure ink in significant amounts.

SUMMARY OF THE INVENTION

A resinous binder is disclosed which is composed of a metal rosin resinate and a dilution increasing effective amount of a pendant tertiary amine polymer type resin having greater than 50,000 weight average molecular weight.

Also disclosed is a gravure printing ink which comprises a solvent, a colorant and a binder wherein all or a portion of the binder consists of the resinous binder of this invention. The use of the resinous binder of this invention in ink compositions results in significant dilution improvement without adversely affecting other desirable properties.

DETAILED DESCRIPTION OF THE PREFERRED EMBODIMENTS OF THE INVENTION

The rosin resinates employed to prepare a major portion of the ink binder compounds of this invention are well known as are the methods of their preparation. The resinate used may be any one of those conventionally used as binders in gravure printing inks. These are typically metal rosin resinates which can include but are not limited to zinc, magnesium and calcium resinates of rosins such as gum rosin, wood rosin and tall oil rosin, polymerized or dimerized rosins, formaldehyde-modified rosins, phenolmodified rosins, hydrocarbon-modified rosins, maleic-modified rosins, fumaric-modified rosins and the like.

The metal rosin resinates may be prepared according to the methods described, for example, in the U.S. Pat. No. 4,198,329 (Rudolphy et al., 1980), No. 4,528,036 (Rudolphy, 1985), and No. 4,552,592 (Rudolphy et al., 1985), all of which are incorporated herein by reference.

The pendant tertiary amine polymers added to the metal resinates to prepare the resinous binders of the invention are those having good solubility in toluene and/or the mixed aliphatic/toluene solvents common to gravure printing, weight average molecular weights ($M_w$) of at least about 50,000 as measured by gel permeation chromatography against polystyrene standards, and from 0.01-2 meg/g of pendant tertiary amine groups. These polymers may be prepared by a variety of known methods, preferably by free-radical copolymerization of at least two monomers, where one monomer provides to the copolymer good solubility, low cost, and high glass transition temperature, and the other monomer provides the tertiary amine. Representative of preferred monomers of the first type are styrene and alkyl acrylates and methacrylates where the alkyl group is methyl, n-butyl, iso-butyl, sec-butyl and tert-butyl. Representative of preferred amine monomers are vinyl pyridine, dimethylaminoethylacrylate, dimethylaminoethylmethacrylate, dimethylaminopropylacrylamide, dimethylaminopropylmethacrylamide, and the like. Modifying amounts of other monomers may be used with these monomers to adjust solubility, melting point, etc., for example, isoprene, acrylonitrile, butadiene, isobutylene, other alkyl acrylates and methacrylates, substituted styrenes, allyl alcohol, allyl chloride, vinyl chloride, and the like.

Preferred pendant tertiary amine polymers are poly-(alkyl, co-dimethylaminoethyl) methacrylates wherein the alkyl group is n-butyl, iso-butyl, sec-butyl, and tert-butyl, having up to 30% by weight of the amine monomer. This material can be made in solution or emulsion forms by well-known free-radical polymerization techniques. See "Preparative Methods of Polymer Chemistry," W. R. Sorenson and T. W. Campbell, *Interscience* 2nd Ed. (1968), p. 249 for an example of emulsion polymerization of acrylate monomers.

Alternatively, a polymer having no pendant amine groups may be prepared and then treated to give a polymer useful in the present invention. A preferred polymer of this type is the material resulting from treatment of styrene-maleic anhydride and alkylmethacrylate-maleic anhydride copolymers or alkylmethacrylate homopolymer with dimethylamino propylamine (DMAPA). See U.S. Pat. No. 3,048,487 for preparation of polymers of this type. The DMAPA reacts with the anhydride or ester groups in the polymer chain to give pendant amide-acid, imide or amide groups containing a tertiary amine group.

The art of preparing high $M_w$ polymers having good solubility in gravure ink solvents is extensive. Those skilled in the art will appreciate there are many ways to prepare such polymers with 0.01-3 meg/g pendant tertiary amines. Amines may, for example, be grafted onto existing polymer chains using alkyl-substituted allylamines. The exact form of the polymer chain and pendant amine group is not critical to the invention as long as the resin is compatible with the rosin resinate and has a significant affect on dilution. We find this affect is substantial as long as the pendant amine polymer has a high $M_w$ and possesses at least a small amount of amine-containing groups.

The metal rosin resinate and the pendant tertiary amine polymer may be combined by charging the two resins and additional inert solvent as required in an appropriate vessel and heating the mixture, with stirring, to a temperature within the range of from about 25° C to 130° C, preferably about 70° C to 90° C, at sub- or super-atmospheric pressures, advantageously at autogenous atmospheric pressures. More preferably, the metal rosin resinate is prepared from the rosin and the other required ingredients in the presence of the pendant tertiary amine polymer and, most preferably, the pendant tertiary amine polymer is charged at the end of the process in the emulsion form.

The pendant tertiary amine polymer comprises a minor proportion of the resinous binder, the majority proportion being the metal rosin resinate. The amount of the pendant tertiary amine polymer in the resinous binders may vary widely, for example, from about 0.05% to 20% on total solids of the final formulation of the resinous binder. It is preferred to use as little of the pendant tertiary amine polymer as is effective to increase the dilution value of the final product to the desired level of at least 90 mls and more preferably at least 100 mls as measured from a concentration of 50% solids to a print viscosity of about 7.5 cps so as to keep the formulation cost and product viscosity to a minimum. For these reasons, the preferred use level of the pendant tertiary amine polymer is about 0.1 to 3%, solids basis.

The resinous binder is advantageously prepared in the presence of an inert solvent. The term "inert solvent" as used herein means a solvent for the starting materials which does not enter into or adversely affect the desired course of the preparation. Representative of inert solvents are toluene, Lactol spirits, and like hydrocarbon solvents.

There are many variations in the art for the preparation of metal rosin resinates. These include modification of rosin with phenols and formaldehyde, maleic anhydride and/or fumaric acid, hydrocarbon materials such as dicyclopentadiene, poly(dicyclopentadiene), and low-cost materials such as tall oil pitch and urea. The polymers of the present invention may be used in combination with all such metal rosin resinates having any level of dilution by themselves to improve dilution, although the efficacy of a particular polymer may vary according to the exact composition of the base metal rosin resinate. For example, the polymers of the present invention may be combined with a low dilution resinate to give a moderate to high dilution resinate. In the preferred embodiment of the invention, 0.01–3% of the pendant tertiary amine polymer is combined with a resinate having moderate to high dilution to give a new resinate having acceptable viscosity, good viscosity stability, and about 100–110 mls toluene dilution measured from 50% solids to a print viscosity of 7.5 cps.

Those skilled in the art will appreciate other variations which may be used to prepare the resinates of the invention. It should be appreciated, for example, that certain pendant tertiary amine polymers (e.g., powders and varnishes) can be blended into the metal rosin resinate base at ambient temperatures and may even be added directly with the resinate to an ink formula during its preparation. Particularly advantageous is to add the polymer as a varnish, powder, or high-solids emulsion by itself directly to an ink in the final "let-down" stage of the ink-making process to improve ink dilution.

The gravure ink compositions of the invention are prepared by simple admixture of a binder component at least a portion of which is comprised of the resinous binder of the invention, a colorant, a solvent and, optionally, other conventional binders. The proportion of binder component which is used is an amount which is effective to function as an ink binder, generally from 10 to 35 percent by weight of the final ink. The amount of the pendant tertiary amine polymer-modified resinous binder which is included in the ink is an amount which is effective to increase the dilution.

The colorant may be any of the known pigments used in publication gravure inks, such as carbon black, iron blue complexes, barium lithol reds, azo yellows, phthalocyanines, or any other desired pigments of the types customarily used in such inks. The colorant can be added as such, or pre-dispersed in a liquid resinate medium to make an ink base as is commonly practiced in ink formulations. The choice of colorant is within the skill of the ink compounder and is not a critical feature of the invention, except that a pigment normally is present in a gravure printing ink. Soluble dyes may also be used, and the term colorant is meant to encompass both dyes and pigments. A coloring-effecting proportion of the colorant is used in the composition, generally 0.5 to 10 weight percent of the ink composition.

The solvent may be any of the aromatic hydrocarbon solvents conventionally used in publication gravure ink formulation, such as toluene, xylenes, trimethylbenzenes, aliphatic and aromatic naphthas, or the like, and blends of these, the preferred solvent being toluene for reasons of cost, acceptable toxicity and good rheological and evaporation properties. The solvent is used in an amount sufficient to wet and disperse the resinate and pigment with an acceptable print viscosity.

Additional components may be present in the inks of the invention, such as dispersing agents, surfactants, minor amounts of cosolvents, odorants, and the like.

Advantageously, the inks of the invention are prepared by first dispersing a pigment (or pigment concentrate) in any known low viscosity ("grinding") resinate by sufficient agitation, and shearing to comminute and disperse the pigment particles using a ball mill, shot mill or other equipment designed for this purpose. This concentrated pigment dispersion ("ink base") is then mixed with good agitation with the high-dilution resinous binder of the invention. The final ink is obtained by adding solvent to this pigment-resinate mixture until the desired viscosity is reached.

The resinous binders of the present invention are distinguished from the prior art resinates in that the pendant tertiary amine polymers have neither high conventional amine number, since tertiary amines do not titrate, nor high acid number and possess high molecular weight and excellent toluene solubility rather than low molecular weight and marginal toluene compatibility. The preferred pendant tertiary amine polymers are much less expensive than the cellulose derivatives heretofore used, possess a very high Tg which aid block resistance and have excellent toluene solubility. The use of additional expensive cellulosic dilution builders can be decreased or avoided where these new resinous binders are employed. In consequence, the cost-effective use level of the pendant tertiary amine polymers is lower and the over-all resinous binder cost is lower. In addition, the gelation problems associated with the use of the amino-polyamide-modified resinates of the prior art are avoided, as is the use of a compatibilitizing solvent such as an alcohol or ketone.

Those skilled in the art will appreciate these and other advantages described hereinafter and associated with the resinous binder and ink compositions of the present invention.

The following examples show the manner and process of making and using the invention and sets forth the best mode contemplated by the inventors for carrying out the invention, but are not be construed as limiting the scope of the invention.

In the following examples, non-volatiles (or solids) content, or NV, is measured by weighing a 1–5g sample of resinate or polymer varnish into a metal pan and evaporating the solvent, first at room temperature for about 1 hour, and then in a vacuum oven for 45 minutes at a temperature of about 100° C. The sample is then cooled and re-weighed. NV is then calculated by the formula:

$$NV = \frac{\text{Residue Weight}}{\text{Sample Weight}} \times 100\%$$

Dilution measurements are made following industry standard practice by weighing out a 100g resinate sample having about 50% non-volatile content and adding toluene to this at about 25° C. with stirring. The Shell No. 2 Cup viscosity of the blended sample is measured and toluene addition continued until a reading of 18.0 seconds. equivalent to about 7.5 cps, is obtained. Dilution is recorded as the number of milliliters of toluene used to achieve this viscosity.

Alternatively, the concentration at print viscosity (CPV) can be determined by diluting a sample of resinate of any NV until the blend viscosity falls to 18.0 seconds, No. 2 Shell Cup. The dilution from 50% NV can be calculated from the CPV by the equation:

$$\text{Dilution (50\% } NV) = \frac{\frac{5000}{CPV} - 100}{0.867}$$

where 0.867 is the density of toluene.

The power of a polymer to increase the dilution of a given resinate formula is measured by first preparing a combination of a major portion, typically 98–99%, solids basis, of resinate of known 50% NV dilution (the "base" resinate) and a minor portion, typically 1-2%, solids basis, of polymer. The 50% NV dilution of the combination is then measured. The difference between the dilution value of the combination and the dilution of the resinate alone (the "base" dilution) is a measure of the power of the polymer to increase dilution.

This difference depends, however, on the exact amount of polymer used. To compare the power of different polymers, the difference value is corrected to exactly 1% loading by dividing the actual difference value by the loading expressed as a percent. As illustrated below, polymers having no pendent amine groups may have dilution power values up to about 6 1mls at 1% loading, whereas the polymers of the invention have dilution values of over 15 mls, even as high as 75 mls.

The power of the polymer to increase dilution is dependent somewhat on the type of "base" resinate used as the majority portion of the combination. There is no mathematical expression of this dependency. Therefore, for comparisons between polymers to be exact, the same "base" resinate must be used. We find that reasonably exact comparisons can be made between polymers as long as the "base" resinates, when different, have about the same "base" dilution.

EXAMPLE 1

Comparative Example A polymer-modified rosin resinate was prepared by blending 98 parts (solids basis) of Uni-Rez 1131, a rosin resinate product of Union Camp Corporation containing 50% toluene and having a 50% NV dilution of 82 mls, and 2 parts (solids basis) of a dilute toluene solution of a methyl methacrylate homopolymer having a weight average molecular weight of about 500,000. Blending was done by heating the resinate to about 70° C. with stirring in a round-bottom flask under a blanket of nitrogen and adding the polymer solution dropwise over a few minutes. Stirring was continued for about 30 minutes to ensure a homogeneous blend. The blend was then cooled to ambient temperature and the 50% NV dilution measured as 93 mls. The dilution difference for poly(methyl methacrylate) is therefore 11 mls at a 2% loading, or 5.5 mls at a 1% loading for Uni-Rez 1131 as "base" resinate.

EXAMPLE 2

Poly(Styrene-co-vinylpyridine)

To a 50 ml round-bottom flask was charged a mixture of 9.50g (91.2 mmoles) styrene, washed with dilute sodium hydroxide and passed through a short column of activated alumina, and 0.150g (4.8 mmoles) 2-vinylpyridine, used as received. To this was added 0.05g azoisobutyronitrile (AIBN) initiator and the charge was heated on a glycol bath to 60° C. for about 3 hours, then 65° C. for about four hours. After standing overnight, an additional 0.25g AIBN was added and the charge was held at 70° C. for four hours, then 75° C. for four hours. After standing overnight, the charge was heated to 80° C. and dissolved in toluene, precipitated in pentane, then re-dissolved in toluene and dried, first in air, then in the vacuum oven, to qive about 7q of polymer. This polymer was combined at a 2% loading with a rosin resinate having a base dilution of 61 mls, following the procedure of Example 1, to give a resinate having a 50% NV dilution of 96 mls. The dilution power of this polymer is, therefore, 17.5 mls per 1% loading.

EXAMPLE 3

Amine-Modified Styrene-Maleic Anhydride

A pendant-amine polymer was prepared from a poly(styrene-co-maleic anhydride) resin containing about 8% by weight maleic anhydride chain residues and having a molecular weight of about 250,000 by dissolving 100 parts of the resin in about 500 part toluene, adding about 8 parts dimethylaminopropylamine (1 molar equivalent per molar equivalent anhydride groups for a pendant tertiary amine content of about 0.75 meg/g), and warming the mixture to about 70° C. for about one hour.

Following the procedure of Example 1, this polymer was combined at a loading of 2% with a rosin resinate having a base dilution of 86 mls to give a modified resinate with a 50% NV dilution of 141 mls. The power of this polymer, then, is 27.5 mls per 1% loading.

EXAMPLE 4

Demonstration of the Importance of Molecular Weight

Two random copolymers comprised of 85 weight percent methyl methacrylate and 15 weight percent dimethylaminoethylmethacrylate (DMAEMA) were prepared in toluene solution at GPC weight average $M_w$s of 200,000 and, for comparison, 9,000, and combined with a phenol-modified rosin resinate having a base dilution of 120 mls, following the procedure of Example 1. The dilution power of the high $M_w$ polymer was 32 mls. In contrast, the dilution power of the low $M_w$ polymer was only 2 mls. EXAMPLE 5

To a three-necked one-1 round bottom flask was added about 350 mls of DI water, 4.0 Tersitol NP-40 non-ionic surfactant and 2.4g of a 28% solution of sodium lauryl sulfate. This mixture was warmed to about 40° C. and purged with nitrogen with stirring to dissolve the surfactants. The mixture was then cooled to room temperature and 107.2g n-butyl methacrylate and 26.8g of DMAEMA were added.

When the system was purged with nitrogen thoroughly, 0.27g ammonium persulfate was added. Within three minutes the mixture began increasing in temperature without external heating, reaching 48° C. after an additional ten minutes, when it was judged complete. It was then heated to 90° C. briefly then cooled and poured into a bottle through a screen. The calculated tertiary amine content of this polymer is 1.27 meg/g. The dilution power of this polymer was measured by first drying the emulsion under vacuum, dissolving the dried resin in toluene, and adding the toluene solution to the same resinate used in Example 4. The dilution power of this emulsion polymer was 76 mls.

EXAMPLE 6

A polymer comprised of 85g of styrene and 9g of DMAEMA was prepared following the procedure of Example 5, except that the polymerization was carried out at 70° C. for 45 minutes prior to final warming to 90° C. This material was dried under vacuum and dissolved in toluene. It had a calculated pendant tertiary amine content of 0.61 meg/g and a dilution power of 49 mls measured in the same resinate used in Example 4.

What is claimed is:

1. A resinous binder comprised of (a) a major proportion of a metal rosin resinate and (b) a minor proportion of a pendant tertiary amine polymer having a weight average molecular weight of at least 50,000 and 0.01-3 meg/g of tertiary amine groups; said pendant tertiary amine polymer being present in the resinous binder in an amount which is effective to increase the dilution of the resinous binder as compared to the dilution of the metal rosin resinate alone.

2. A resinous binder comprised of a major proportion of (a) a metal rosin resinate and (b) a minor proportion of a pendant tertiary amine polymer having a weight average molecular weight greater than 50,000 and 0.01-3 meg/g of tertiary amine groups wherein said minor proportion is an amount which is effective to impart to the resinous binder a toluene dilution value of at least 90 mls to a print viscosity of about 7.5 cps measured from a concentration of 50% solids non-volatile of the resinous binder.

3. The resinous binder according to claim 2 wherein the metal of the metal rosin resinate is selected from the group consisting of zinc, magnesium and calcium.

4. The resinous binder according to claim 2 wherein the metal rosin resinate is prepared from a rosin selected from the group consisting of gum rosin, wood rosin, tall oil rosin, polymerized rosin, dimerized rosin, maleic-modified rosin, fumaric-modified rosin, formaldehyde-modified rosin, tall oil pitch-modified rosin, dicyclopentadiene-modified rosin and phenol-modified rosin.

5. The resinous binder according to claim 2 wherein the amine group of the pendant tertiary amine polymer is selected from dimethylaminopropyl, dimethylaminoethyl, and pyridyl.

6. A resinous binder comprised of (a) a major proportion of a metal rosin resinate and (b) a minor proportion of a polyacrylate copolymer prepared by the free-radical polymerization of a mixture of alkylacrylate and/or methacrylate monomers and an amine monomer selected from the group consisting of dimethylamminoethylacrylate, dimethylaminoethylmethacrylate, dimethylaminoethylacrylammide, dimethylaminoethylmethacrylamide, and vinyl pyridine; said copolymer having a weight average molecular weight of greater than or equal to 50,000 and 0.01-3 meg/g of tertiary amine groups, wherein said minor proportion is an amount which is effective to impart to the resinous binder a toluene dilution value of at least 90 mls to a print viscosity of about 7.5 cps measured from a concentration of 50% solids non-volatile of the resinous binder.

7. A resinous binder comprised of (a) a major proportion of a metal rosin resonate and (b) a minor proportion of a polymer derived from a styrene-maleic anhydride copolymer containing from 1 to 10 mole percent maleic anhydride-derived polymer chain units by reaction with from 1 to 20 mole percent of dimethylaminopropylamine; sad polymer having a weight average molecular weight of equal to or greater than 50,000 and 0.01-3 meg/g of tertiary amine groups, wherein said minor proportion is an amount which is effective to impart to the resinous binder a toluene dilution value of at least 90 mls to a print viscosity of about 7.5 cps measured from a concentration of 50% solids non-volatile of the resinous binder.

8. A printing ink composition comprised of a colorant, a solvent and a component binder wherein at least a portion of the component binder is a resinous binder comprised of a major proportion of a metal rosin resinate and a minor proportion of a pendant tertiary amine polymer having a weight average molecular weight of at least 50,000 and 0.01-3 meg/g of tertiary amine groups; said pendant tertiary amine polymer being present in the resinous binder in an amount which is effective to increase the dilution of the resinous binder as compared to the dilution value of the metal resinate alone.

9. An ink composition comprised of a colorant, a solvent and a binder component wherein at least a portion of the binder component is a resinous binder comprised of a major proportion of (a) a metal rosin resinate and (b) a minor proportion of a pendant tertiary amine polymer having a weight average molecular weight greater than 50,000 and 0.01-3 meg/g of tertiary amine groups wherein said minor proportion is an amount which is effective to impart a toluene dilution value of at least 90 mls to a print viscosity of about 7.5 cps measured from a concentration of 50% solids of said resinous binder.

10. The ink composition according to claim 9 wherein the metal of the metal rosin resinate is selected from the group consisting of zinc, magnesium and calcium.

11. The ink composition according to claim 9 wherein the metal rosin resinate is prepared from a rosin selected from the group consisting of gum rosin, wood rosin, tall oil rosin, polymerized rosin, dimerized rosin, maleicmodified rosin, fumaric-modified rosin, formaldehyde-modified rosin, tall oil pitch modified rosin, dicyclopentadiene-modified rosin and phenol-modified rosin.

12. An ink composition comprised of a colorant, a solvent and a binder component, wherein at least a portion of the binder component is a resinous binder comprised of a major proportion of (a) a metal rosin resinate and (b) a minor proportion of a polyacrylate copolymer prepared by the free-radical polymerization of a mixture of alkylacrylate and/or methacrylate monomers and an amine monomer selected from the group of dimethylaminoethylacrylate, dimethylaminoethylmethacrylate, dimethylaminoethylacrylamide, dimethylaminoethylmethacrylamide, and vinyl pyridine; said copolymer having a weight average molecular weight greater than 50,000 and 0.001-3 meg/g of tertiary amine groups, wherein said minor proportion is an amount which is effective to impart a toluene dilution value of at least 90 mls to a print viscosity of about 7.5 cps measured from a concentration of 50% solids of said resinous binder.

13. An ink composition comprised of a colorant, a solvent and a binder component, wherein at least a portion of the binder component is a resinous binder comprised of a major proportion of (a) a metal rosin resinate and (b) a minor proportion of a polymer derived from a styrene-maleic anhydride copolymer containing from 1 to 10 mole percent maleic anhydride-derived polymer chain units by reaction with from 1 to 20 mole percent of dimethylaminopropylamine; said polymer having a weight average molecular weight greater than 50,000 and 0.01 meg/g of tertiary amine groups, wherein said minor proportion is an amount which is effective to impart to toluene dilution value of at least 90 mls to a print viscosity of about 7.5 cps measured from a concentration of 50% solids of said resinous binder.

14. The ink composition according to claim 13 wherein the polymer contains up to 40% by weight of monomer units obtained by copolymerization of styrene with a member selected from the group consisting of isoprene, butadiene, acrylonitrile, an acrylic acid ester, a methacrylic acid ester and a p-alkyl substituted styrene.

15. The ink composition according to claim 9 wherein the resinous binder is comprised of from about 0.1 to about 20% by weight of the pendant tertiary amine polymer.

16. The ink composition according to claim 15 wherein the pendant tertiary amine is added to the ink base prepared first by admixture of colorant, solvent, and a resinate binder.

* * * * *